United States Patent [19]

Voorhees

[11] 4,171,655

[45] Oct. 23, 1979

[54] STABILIZED CENTER-DISTANCE ADJUSTER FOR ROTARY DIE CUTTERS

[75] Inventor: Philip V. Voorhees, Hinsdale, Ill.

[73] Assignee: Western Printing Machinery Co., Schiller Park, Ill.

[21] Appl. No.: 924,148

[22] Filed: Jul. 13, 1978

[51] Int. Cl.[2] .......................... B23D 25/12; B26D 1/56

[52] U.S. Cl. ........................................ 83/344; 83/348; 83/345; 308/62

[58] Field of Search ................. 83/344, 345, 348, 343, 83/37, 699; 308/62

[56] References Cited

U.S. PATENT DOCUMENTS

| | | | |
|---|---|---|---|
| 2,711,935 | 6/1955 | Miles | 308/62 |
| 3,222,966 | 12/1965 | Tornberg et al. | 83/344 X |
| 3,720,126 | 3/1973 | Kranz | 83/344 |

*Primary Examiner*—Donald R. Schran
*Attorney, Agent, or Firm*—Rummler & Snow

[57] ABSTRACT

An eccentric center-distance adjuster for rotary die cutters having load-biased screw adjustment of the center-distance between rotary die cutting cylinders which is stabilized against the die cutter frame in the same direction as the cutting load between said cylinders thereby minimizing cylinder bounce.

8 Claims, 4 Drawing Figures

2
34
46
8
38
33
31
32
50
20
35
100
104
65
64
76
68
96
92
72
61
18
79
38
60
56
59
84
88
80
14
22
56'
10
26
53

STABILIZED CENTER-DISTANCE ADJUSTER FOR ROTARY DIE CUTTERS

BACKGROUND OF THE INVENTION

Rotary die cutter cylinders have traditionally been constructed with bearer rings mounted at each end of each cylinder body. These rings are run against rings on the adjacent cylinder and maintain a fixed center-distance between the cutting cylinders. The bearings supporting one of the cylinders are mounted in eccentric housings which, when rotated, provide a means to move one set of bearer rings mounted on the same cylinder against the adjacent cylinder bearer rings with some degree of force. An adjusting screw, anchored to the frame at one end, is typically used to actuate the rotation of the eccentric.

Working clearance is needed around the eccentrics in their frame support bores, and backlash is required in the threads of the adjusting screw to provide lubrication and prevent sliding surfaces from seizing. The action of forcing the rotary die cutter cylinder bearer rings against each other tends to maintain a fixed cylinder-to-cylinder center distance, neutralizes working clearance and backlash looseness, and prevents cylinder separation due to cutting load impact and cylinder bounce. Cylinder bounce increases die knife wear and makes it necessary for the die knife to run at a greater average distance to the anvil cylinder, thereby cutting down on die cutter ability to cut thinner and softer products cleanly.

The maintenance of a stable cylinder center-distance is required since this distance determines the die knife height relative to the anvil cylinder. The die knife is adjusted to "kiss contact" the anvil cylinder for proper cutting. The bearer rings are undesirable because they prevent this center-distance adjustment, cause center-distance variations due to surface imperfections, cause the rotary die cutting cylinders to be longer by the width of the bearer rings which adds to objectionable cylinder deflection and substantially increases the load on the cylinder bearings resulting in shorter bearing life.

In the prior art bearer rings fix center-distance, and any needed change in die knife height due to wear or manufacturing irregularities must be accommodated with shims between the die knife and the die cylinder surface. The use of shims to obtain the proper knife height is an arduous undertaking. Commercial shims are limited to 0.0005 increments. Shims are not commercially available to provide fine height corrections of 0.0001 or 0.0002 inch which are the increments of correction most often desired.

A knife which has been shimmed too high will be damaged by hitting against the anvil cylinder causing rapid cutting edge deterioration. Also, the loading of the bearer rings against each other induces undesirable cylinder bowing which increases the difficulty of obtaining correct die knife height, and any hard foreign material or surface irregularities on the bearer ring will cause undesirable center-distance and therefore die knife height variations. The combination of the above factors causes excessive die knife wear which increases the amount of nonproductive time required for die replacement and shimming, thereby reducing overall productivity.

Therefore, in addition to the elimination of bearer rings, the objectives of this invention are to provide for precise, infinitely variable center-distance adjustability of rotary die cutter cylinders, and at the same time to minimize cylinder bounce.

SUMMARY OF THE INVENTION

The gist of this invention lies in an improved rotationally-adjustable eccentric apparatus for center-distance adjustment of die and anvil cylinders of rotary die cutters. The improvement over this old matter comprises a load-biasing means having a compression coil spring which acts in offset relation to the eccentric apparatus of the old matter so that the resultant load created by the spring force of the improvement working in combination with the reaction force in the adjusting screw of the old matter holds the eccentric housing against the side of the bore in the frame of the die cutter and against the working side of the threads on the center-distance adjusting screw.

The compression spring mounts on a threaded rod which is engaged at one end in right angle relation with a pivot pin mounted on the eccentric housing. This rod slidingly passes at right angle relation through a second pivot pin mounted on the frame. The spring bears at one end against the side of the pivot pin on the frame and at the other end against a jamb nut and washer combination threaded on the other end of the rod. The pin in the eccentric housing is located at a point away from the bore center and the pivot pin in the frame is located so that the axis of the spring and rod of the improvement combination is positioned to apply a force creating a moment about the axis of the eccentric housing which is in equilibrium with a moment generated by the reaction force in the adjusting screw.

DESCRIPTION OF THE PREFERRED EMBODIMENT

Figures 1, 4:
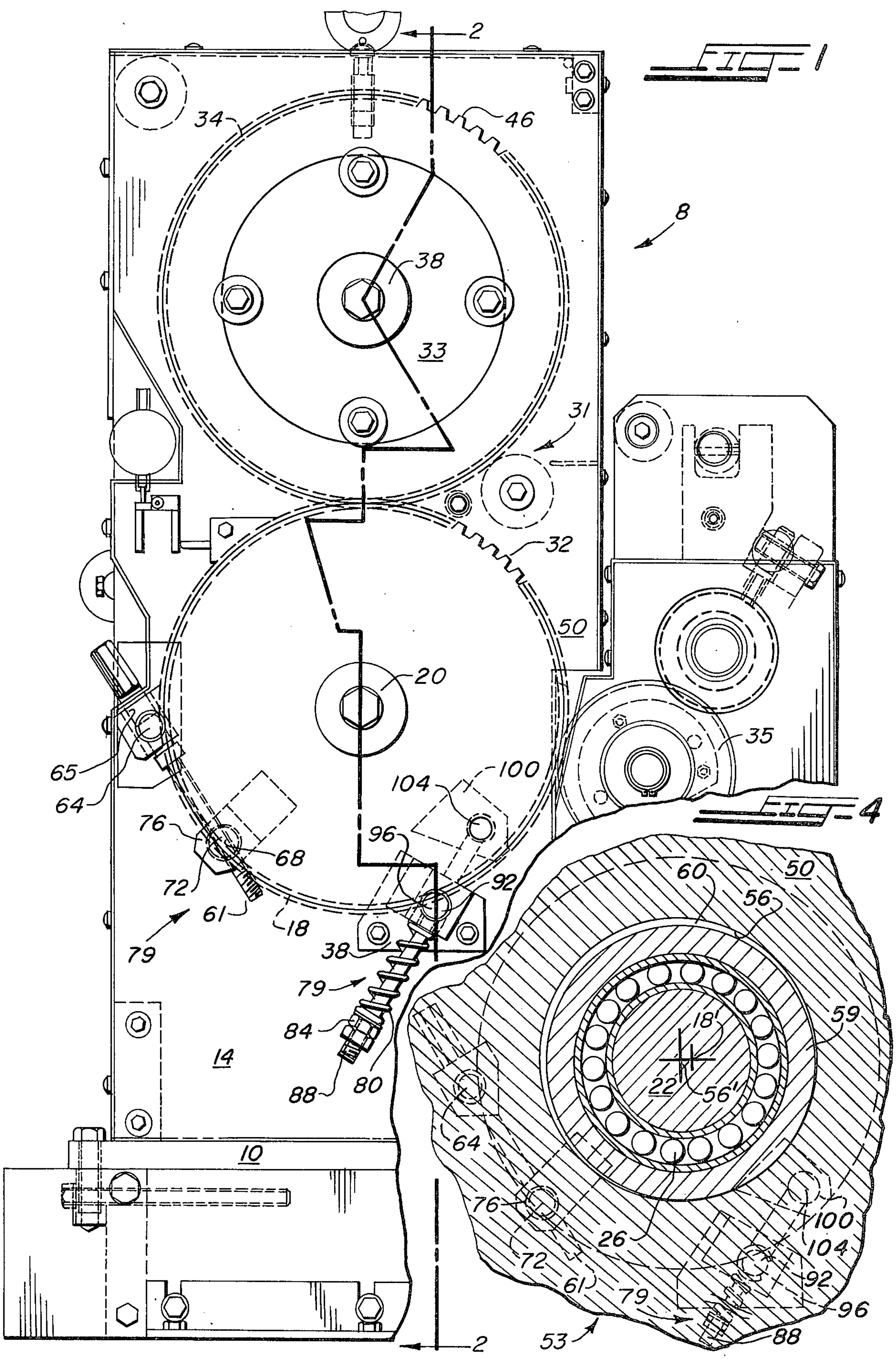
FIG. 1 is a left side view of the stabilized center-distance adjuster of this invention.
FIG. 4 is a fragmentary end view looking out along line 4—4 of FIG. 2.
Figure 2:
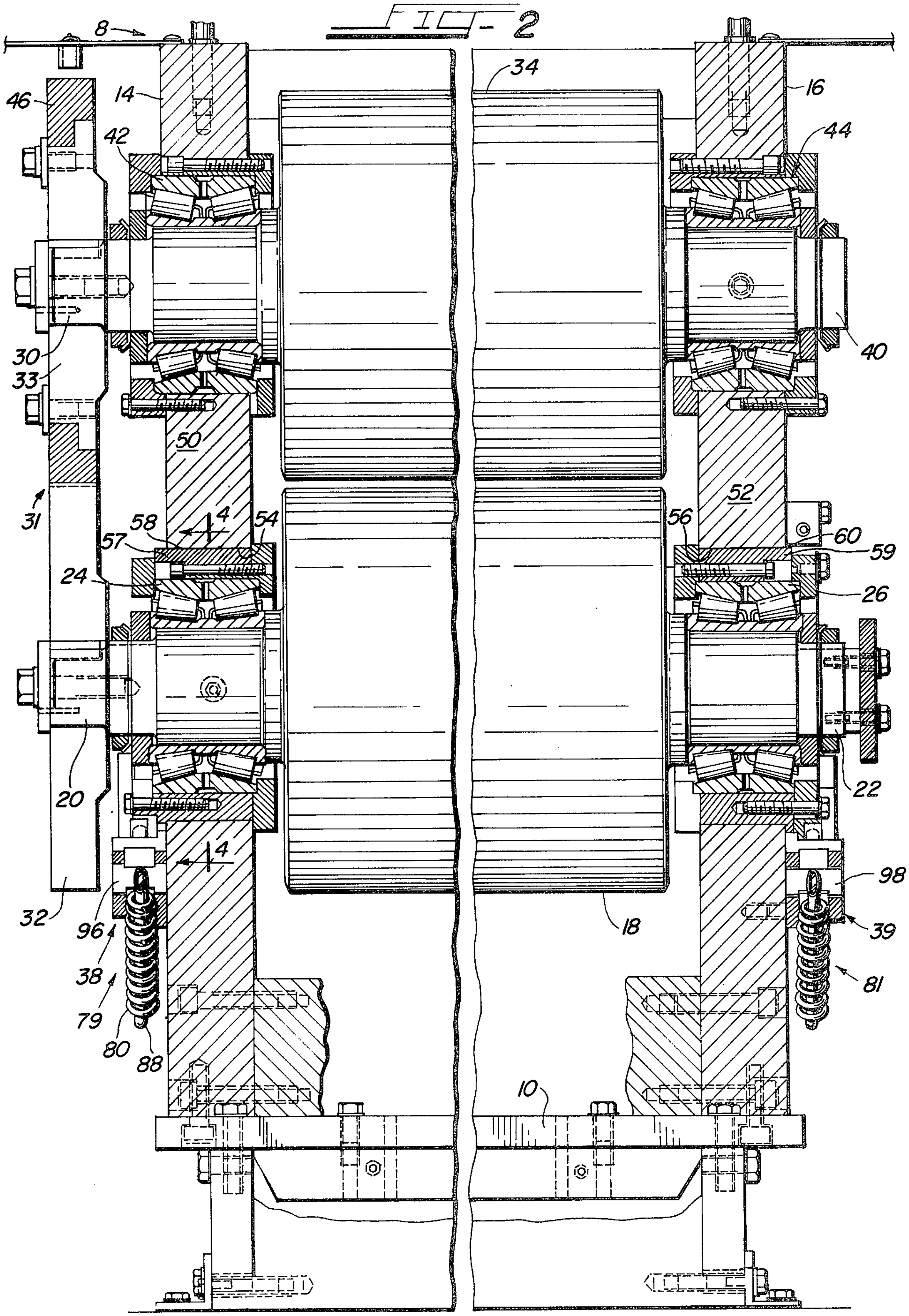
FIG. 2 is a fragmentary front view of the same along line 2—2 of FIG. 1.
Figure 3:
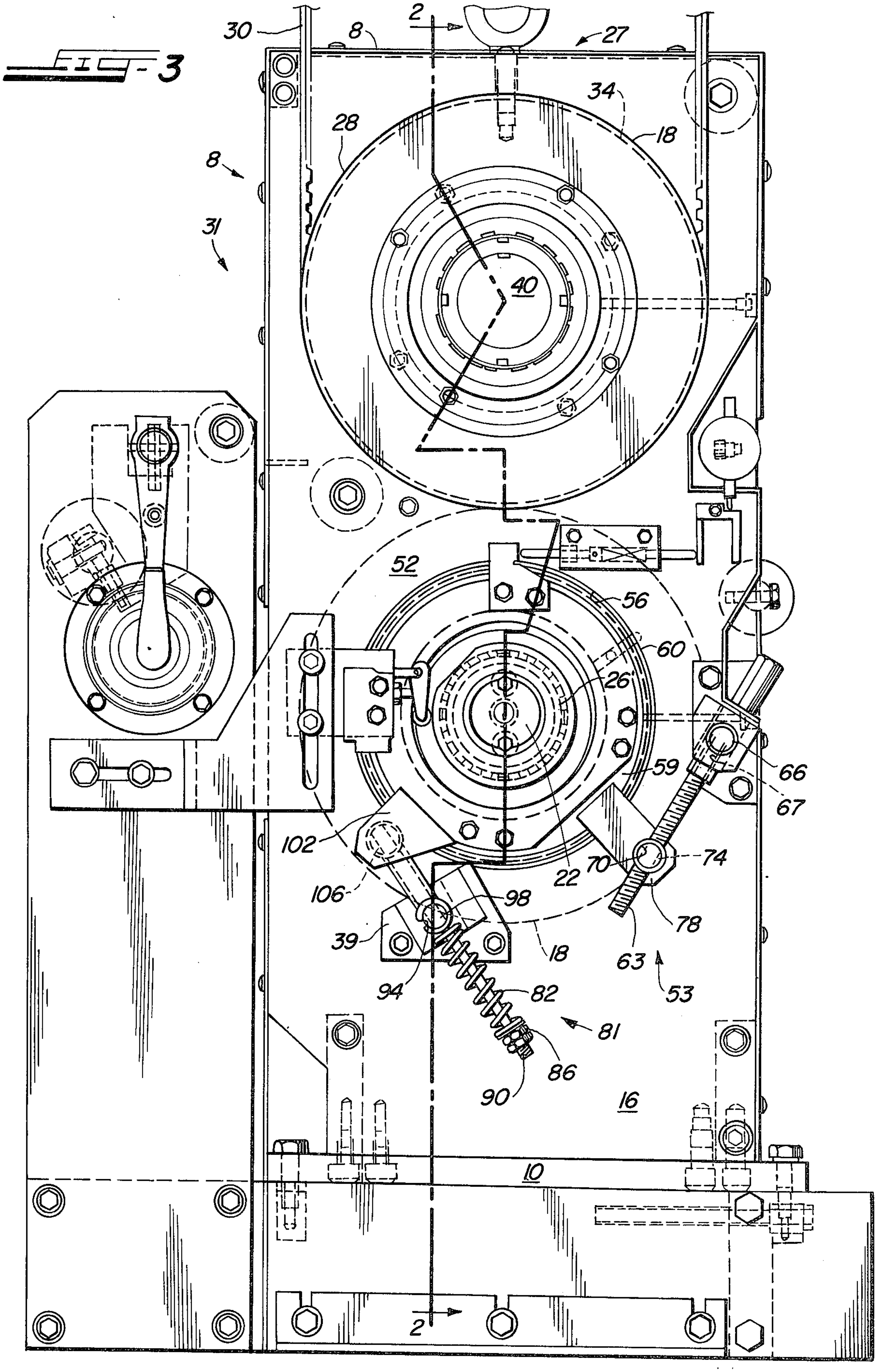
FIG. 3 is a right side view of the same.

Reference to FIG. 1 shows a left side view of a rotary die cutter frame 8 having a base 10 upon which a drive side 14 is erected, as shown in FIG. 1, in spaced parallel relation to an operating side 16 erected at the opposite end thereof, as shown in FIG. 3. An anvil cylinder 18, having journals 20 and 22 extending from each end of said cylinder in mutual concentric relation therewith, rotates in taper-roller bearings 24 and 26, respectively, which are installed in spaced and aligned relation on each of said journals 20 and 22 in eccentric housings 57 and 59 which mount in side plates 50 and 52 in the frame 8, as shown in FIG. 2. Bearings 42 and 44 mount in side plates 50 and 52 on opposite drive side and operating side 14 and 16 of frame 8, respectively. A die cylinder 34, also having journals 30 and 40 extending from each end thereof in mutual concentric relation therewith, rotates in over-and-under relation to the anvil cylinder 18 in like taper-roller bearings 42 and 44 which are in aligned relation on each shaft 30 and 40, respectively. Die cylinder 34 has its axis of rotation in parallel and spaced relation to that of cylinder 18 so that the center-distance between the two axes equals the diameter of cylinder 18.

A gear train 31 comprises a driven spur gear 32 having the same pitch diameter as cylinder diameter 18, which mounts in keyed relation to the journal 20 adjacent to the outside of drive side 14 of the die cutter, as shown in FIGS. 1 and 2, and a driven spur gear 46 which likewise has the same pitch diameter as gear 32 and mounts on hub 33 which mounts in keyed relation on the journal 30 adjacent to the outside surface of the drive side 14 of the same. Spur gear 46 operationally meshes with spur gear 32, as shown in FIGS. 1 and 2, to coordinate the rotational position of the die cylinder 34 with the anvil 18. A drive gear 35 operationally meshes with gear 32 for positive transmission of rotary power from a prime mover (not shown) to the die cutter.

Reference to FIGS. 1 and 3 shows a conventional eccentricity adjusting means 51 and 53 mounted about the axis of the anvil cylinder 18 on both the drive and the operating sides 14 and 16 of the die cutter, respectively, for adjusting the center-distance between the axes of the die cylinder 34 and the anvil cylinder 18, respectively. Eccentricity adjusting means 51 and 53 comprise side plates 50 and 52 which are part of ends 14 and 16 of frame 8, respectively, having in-line throughbores 54 and 56, as shown in FIG. 2, which are centered at point 54' (not shown) and 56', respectively, in an offset relation to the axis of anvil cylinder 18 which is centered at point 18' in a direction towards the front of the frame 8 of the die cutter, as shown in FIG. 4. Eccentric housings 57 and 59 mount in the bores 54 and 56 having working clearances 58 and 60, respectively, between the outer diameter thereof and the inner diameter of said bores, as shown in FIGS. 2 and 4. Bearings 24 and 26, which are mounted in and supported by bores in the eccentric housings 57 and 59, support the journals 20 and 22 on the axis of cylinder 18.

Screws 61 and 63 of eccentricity adjusting means 51 and 53, respectively, pivotally mount adjacent their hexed ends against one side of first pivot pins 64 and 66 and extend transversely through bores 65 and 67 which extend through the shanks of first pivot pins 64 and 66. Setscrewed collars 69 and 71 mount on shanks of screws 61 and 63, respectively, against the other side of pivot pins 64 and 66. Pins 64 and 66 are pivotally mounted on and extend outwardly from the side of side plates 50 and 52 in a direction parallel to the axes of cylinders 18 and 34 on both the drive and operating sides 14 and 16, respectively. The threaded ends of said screws 61 and 63 are anchored in and engage threaded transverse bores 68 and 70 in second pivot pins 72 and 74 which pivotally mount on adjusting ears 76 and 78 which are a part of eccentric housings 57 and 59, respectively. Pins 72 and 74 extend out from the side of eccentric housings 57 and 59 having their axes parallel to the axes of cylinders 18 and 34 and in spaced relation with bore centers 54' and 56' and the axis of the cylinder 18 on center 18'.

FIGS. 1, 2 and 3 show an eccentric load-biasing means 79 and 81 comprising adjustable compression springs 80 and 82 each of which is mounted on rods 88 and 90, respectively, and is restrained at one end thereof by jamb nut fasteners 84 and 86 threaded to rods 88 and 90. Rods 88 and 90 are guided at their midlength by and are free to slide axially within transverse sliding bores 92 and 94 in third pivot pins 96 and 98 which mount on brackets 38 and 39 which are mounted on the drive side 14 and operating side 16, respectively, and aligned in a direction parallel to the axes of cylinders 18 and 34. Load-biasing ears 100 and 102 are part of and extend out from the side of eccentric housings 57 and 59 having their axes parallel to the axes of cylinders 18 and 34 and in spaced relation with bore centers 54' and 56' and the axis of cylinder 18 on center 18' but not coincident with the axes of pins 72 and 74 on ears 76 and 78, respectively. The other ends of said rods 88 and 90 are engaged and anchored in the fourth pivotal pins 104 and 106 which mount on load-biasing ears 100 and 102 on the drive side 14 and operating side 16, respectively. The other ends of said compression springs 80 and 82 are restrained against the sides of the third pivot pins 96 and 98 at the junctures of transverse sliding bores 92 and 94 with rods 88 and 90.

Although but one specific embodiment of this invention is herein shown and described, it will be understood that details of the construction shown may be altered or omitted without departing from the spirit of the invention as defined by the following claims; i.e., load application and reaction means may be lugs or milled pockets as well as pins; load generating (creating) means may be pneumatic or hydraulic cylinders or weights as well as compression springs; and force transmitting means may be levers or chains as well as rods.

I claim:

1. In a rotationally adjustable eccentric apparatus for center-distance adjustment of die and anvil cylinders of rotary die cutters having a frame, eccentricity-adjusting means and eccentric housings with axes mounted in clearance bores in the same, the improvement comprising an eccentric load-biasing means operationally-cooperating with said housings and said frame in offset relation about said axis; whereby the reaction force from the eccentricity-adjusting means and the applied force on the load-biasing means vectorially combine to produce a resultant force having the same general direction as the applied load between the cutting cylinders.

2. In an eccentric mechanism for rotary die cutters, as set forth in claim 1, wherein the eccentric load-biasing means comprises:

(a) load application means mounted on said housing radially-extending from and in spaced relation with the axis of the same;

(b) load reaction means mounted on the side of said frame spaced from said load application means and said housing axis; and (c) force generating means mounted in relation to said load application means and said load reaction means for urging said load application and load reaction means relative to each other.

3. In an eccentric mechanism for rotary die cutters, as set forth in claim 1, wherein the load application means comprises load-biasing ears having first transversely-bored pins pivotally-mounted on the side of the same.

4. In an eccentric mechanism for rotary die cutters, as set forth in claim 1, wherein the load reaction means comprises load-biasing brackets having second transversely-bored pins pivotally-mounted on the side of the frame.

5. In an eccentric mechanism for rotary die cutters, as set forth in claim 1, wherein the load generating means comprises force transmitting means and force creating means in operational cooperation therewith.

6. In an eccentric mechanism for rotary die cutters, as set forth in claim 1, wherein the force transmitting means comprises rods fixedly engaged in the bore in one of said pins and slidably engaged in the bore in the other of said pins.

7. In an eccentric mechanism for rotary die cutters, as set forth in claim 1, wherein the force creating means comprises a helically-wound, square-end compression spring.

8. In a rotationally adjustable eccentric mechanism for center-distance adjustment of die and anvil cylinders of rotary die cutters having a drive side and an operating side erected on a base, die and anvil cylinders rotationally mounted in approximately parallel and adjacent spaced relation between said drive and operating sides; a drive train operationally connected to one of said cylinders at one end thereof; a cylinder coordinating drive train operationally connected between said cylinders at the same end thereof; support bores located on the drive and operating sides of the frame in eccentrically-spaced relation to the axis of one cylinder and eccentric housings including an axis mounted with clearance in said bores; and adjusting screws operationally-cooperating between said eccentric housings and each of said drive and operating sides through pivotal pins mounted in each side of the same; the improvement comprising first and second pins having transverse bores therethrough pivotally-mounted on said eccentric housings and each of said drive and operating sides, respectively; rods threadedly-engaged at one end in the bores of said first pins and slidably extending through the bores of said second pins having helically-wound, square-end compression springs mounted thereon in abutment against said second pins at one end and against jamb nuts locked on said rods at the other.

* * * * *